June 6, 1967 W. D. GARDEN ETAL 3,323,937
HEAT SEALABLE POLYPROPYLENE FILM
Filed Dec. 9, 1963
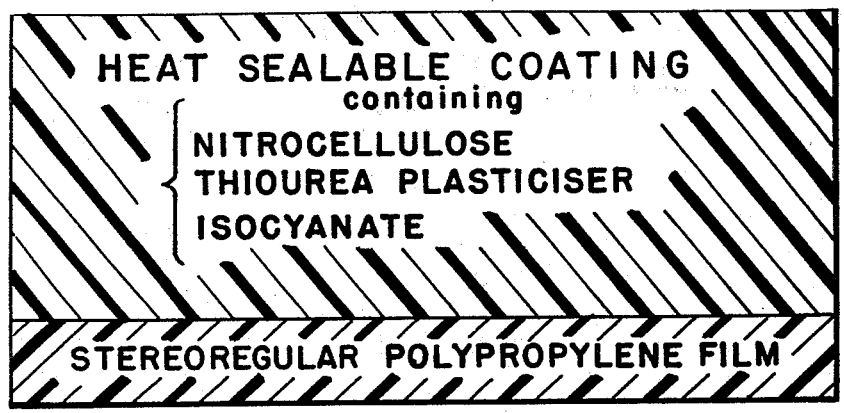
INVENTORS
WILLIAM DAVID GARDEN
ROBERT ARTHUR HALL
BY
ATTORNEYS 3,323,937
HEAT SEALABLE POLYPROPYLENE FILM
William David Garden, Saltcoats, and Robert Arthur Hall, West Kilbride, Scotland, assignors to Imperial Chemical Industries Limited, London, England, a corporation of Great Britain
Filed Dec. 9, 1963, Ser. No. 329,257
Claims priority, application Great Britain, June 14, 1963, 23,806/63
4 Claims. (Cl. 117—47)

This invention relates to heat-sealable films suitable for packaging and to a process of modifying polypropylene film material to render it heat-sealable.

In the specification of co-pending U.K. application No. 47252/62 there is described a heat-sealable film consisting of a layer of stereoregular polypropylene film, which has been subjected to a surface oxidative treatment, and an adhering coating layer on at least one of the surfaces of the polypropylene film, which coating layer comprises industrial nitrocellulose and plasticiser therefor, at least 50 percent by weight of the plasticiser being constituted by normally solid materials. The term "industrial nitrocellulose" means nitrocellulose having an average nitrogen content between 10.7 and 12.2 percent by weight. The ratio of nitrocellulose to plasticiser should preferably be within the range 10:5 to 10:15 by weight.

Preferably the coating layer comprises a resinous material to improve the adhesion between the layers and the heat-seal strength. The proportion of resinous material should preferably be less than the proportion of nitrocellulose and the ratio of the combined weights of resinous material and nitrocellulose to plasticiser should preferably be within the range 10:5 to 10:15 by weight.

The heat-sealable film is made according to the process of the invention by first subjecting polypropylene film to a surface oxidative treatment and applying to at least one of its surfaces a lacquer prepared by dissolving the constituents of the coating layer in a solvent and drying off the solvent. The treatment should preferably be such as to reduce the angle of contact between water and the treated surface to 80° or less. A preferred oxidative treatment is corona discharge.

We have now found that the adhesion between the coating layer and the polypropylene and the heat-seal strength of the film is increased by the incorporation of a minor proportion of an isocyanate into the lacquer before application of the lacquer to the polypropylene surface.

Thus, according to the present invention, the aforedescribed heat-sealable film comprises an isocyanate compound containing a plurality of isocyanate groups per molecule, the ratio of nitrocellulose (dry) to isocyanate group expressed as —NCO, being in the range 10:0:4 to 10:0:05 when the lacquer is compounded and applied to the polypropylene.

The drawing diagrammatically illustrates the invention and shows a heat sealable coating on a stereoregular polypropylene film.

The term "isocyanate compound" is used in this specification to mean not only compounds containing free isocyanate groups but also compounds having isocyanate groups reacted with other compounds containing active hydrogen atoms, e.g., compounds containing hydroxy, carboxy, amino or imino groups.

It is often convenient, especially with lower molecular weight isocyanates, to react a proportion of the isocyanate groups with water or an aliphatic alcohol to increase the molecular weight and consequently reduce volatility. Such materials are useful constituents of the heat-sealable films of this invention and are, for the purposes of this specification, included in the term "isocyanate compound."

The industrial nitrocellulose used in lacquers is commonly "damped" with water or a lower aliphatic alcohol e.g., isopropanol containing a proportion of water. When the isocyanate is added to a lacquer the unreacted isocyanate groups commence to react with the hydroxyl groups present in the water or the alcohol and also react with hydroxyl groups in the nitrocellulose itself. A certain proportion of the isocyanate groups added may be present, therefore, in a reacted form in the lacquer at the time of application of the lacquer to the polypropylene film. In lacquers, reaction of the isocyanate with nitrocellulose is believed to result in a product which is cross-linked to some extent and excessive cross-linking results in lacquers which gel or deposit solid or give brittle coatings and which are consequently unsuitable for use in the process of the invention. However, if the proportion of isocyanate group to nitrocellulose does not exceed 0.4:10 by weight when the lacquer is compounded, suitable coatings having high heat-seal strength are obtained. The gelation rate of the lacquer is minimised by the use of the generally less reactive aliphatic isocyanates as opposed to the generally more reactive aryl isocyanates, by using lower concentrations of isocyanate, by using the lower viscosity grades of nitrocellulose and low solids concentration in the lacquer.

In accordance with the process of the invention, a heat-sealable film is produced by subjecting polypropylene film to a surface oxidative treatment, applying to at least one treated surface of the film a lacquer prepared by dissolving nitrocellulose, plasticiser and an isocyanate compound in a solvent and drying off the solvent, the proportion of nitrocellulose (as dry) to isocyanate group (as —NCO) being in the range 10:0.4 to 10:0.05 by weight when the lacquer is compounded and applied and at least 50 percent by weight of the plasticiser being constituted by normally solid material.

Lacquers to which isocyanate has been added may, if desired, be incorporated into an aqueous emulsion and applied to the polypropylene surface in the emulsified form.

Films of particularly good heat-seal strength are obtained when the solid plasticiser of the coating layer comprises a proportion of aryl-substituted thiourea.

The invention is further illustrated by the following examples in which all parts, percentages and ratios are by weight unless otherwise specified.

In Examples 1–30 the nitrocellulose was industrial nitrocellulose, having an average nitrogen content between 11.2 and 11.8 percent, "damped" with isopropanol in the ratio 30 parts isopropanol to 70 parts dry nitrocellulose. 20 g. (as dry) of this nitrocellulose dissolved in 100 cc. aqueous acetone, prepared by mixing 95 volumes acetone with 5 volumes water, had a viscosity of 15–25 poises at 20° C. The polypropylene film which was coated in the examples was bi-axially drawn polypropylene film 0.013 millimetre thick which had been subjected to corona discharge to the extent that the contact angle of a drop of water on its surface was 72°. Sufficient lacquer was applied to the polypropylene to give a coating layer 0.0013 millimetre thick.

The heat-seal strength of the films was determined by the method given in the specification of U.K. application No. 47252/62.

The lacquers in Examples 1–17 were prepared by dissolving the non-volatile ingredients, except the isocyanate, in a solvent consisting of 6 parts butyl acetate and 4 parts toluene to give a concentration of 10 percent of solids in the solution, allowance being made for the isopropanol "damping" of the nitrocellulose. When solution was complete the isocyanate was added.

Examples 1–7

In these examples a lacquer containing nitrocellulose and dicyclohexylphthalate in the ratio 10:10 was prepared and the following isocyanate compositions were added in the proportions indicated in Table 1. The heat-seal strengths obtained are also given in Table 1.

A. Toluylene diisocyanate;
B. 4:4-diisocyanatodiphenylmethane; 53% in xylene;
C. toluylene diisocyanate reacted with a mixture of glycerol and ethylene glycol to give a polyurethane containing 19 percent by weight of unreacted isocyanate groups: 75 percent in ethyl acetate;
D. hexamethylene diisocyanate reacted with a limited proportion of water, to give a product containing 19 percent of unreacted isocyanate groups; 75 percent in ethyl acetate;
E. toluylene diisocyanate reacted with trimethylolpropane to give a polyurethane containing 13 percent of unreacted isocyanate groups; 75 percent in ethyl acetate.

TABLE 1
[Examples 1–7]

| Example | Isocyanate | Parts isocyanate per 10 parts nitrocellulose | Heat-seal strength (g.) |
|---|---|---|---|
| 1 | A | 0.5 | 105 |
| 2 | B | 0.5 | 95 |
| 3 | C | 1.0 | 125 |
| 4 | D | 0.5 | 90 |
| 5 | D | 1.0 | 130 |
| 6 | D | 2.0 | 175 |
| 7 | E | 2.0 | 120 |

Examples 8–12

In these examples the film coating was nitrocellulose/plasticiser/isocyanate C (as previously described) in the ratio 10:10:1. The plasticiser used and the heat-seal strengths obtained are given in Table 2.

TABLE 2

| Example | Solid plasticiser | Heat-seal strength (g.) |
|---|---|---|
| 8 | Tricyclohexyl citrate | 120 |
| 9 | Glyceryl tribenzoate | 170 |
| 10 | N-cyclohexyl p-toluene-sulphonamide | 150 |
| 11 | Dimethyl diphenyl urea | 80 |
| 12 | Diphenyl phthalate | 90 |

Examples 13–17

In these examples the film coating had the following composition:

| | Parts by weight |
|---|---|
| Nitrocellulose (dry weight) | 10 |
| Dicyclohexyl phthalate | 8 |
| Ethyl phthalyl ethyl glycollate | 2 |
| Isocyanate C (as previously described) | 1 |
| Resin | 3 |

The different resins used and the heat-seal strengths obtained are given in Table 3.

TABLE 3

| Example | Resin | Heat-seal strength (g.) |
|---|---|---|
| 13 | Rosin/maleic condensate | 105 |
| 14 | Aryl sulphonamide-formaldehyde | 110 |
| 15 | Dewaxed dammar resin | 180 |
| 16 | Epichlorhydrin-diphenylolpropane 1 g. equivalent epoxide/485 g. (approx.). | 105 |
| 17 | Ethylene glycol ester of polymerised rosin | 80 |

Examples 18–30

In these examples the film coatings had the compositions and heat-seal strengths given in Table 4.

In preparing the lacquers the diphenyl thiourea and o-tolyl thiourea were prepared as 10 percent solutions in dimethylformamide and mixed with a solution containing 10 percent of the remaining non-volatile ingredients in a 6/4 mixture of butyl acetate and toluene.

TABLE 4

| Example | Composition of coating (parts) | | | | | Heat-seal strength (g.) |
|---|---|---|---|---|---|---|
| | Nitro-cellulose | Dicyclohexyl phthalate (m.p. 65° C.) | Ethyl phthalyl ethyl glycollate (m.p. 20° C.) | s-Diphenyl thiourea (m.p. 150° C.) | o-Tolyl thiourea (m.p. 162° C.) | |
| 18 | 10 | | | 12.5 | | 170 |
| 19 | 10 | | | 10 | | 200 |
| 20 | 10 | | | 7.5 | | 160 |
| 21 | 10 | | | 5 | | 150 |
| 22 | 10 | | | | 12.5 | 170 |
| 23 | 10 | | | | 10 | 180 |
| 24 | 10 | | | | 7.5 | 150 |
| 25 | 10 | | | | 5 | 140 |
| 26 | 10 | 8 | 2 | | | 40 |
| 27 | 10 | 6 | 2 | 2 | | 60 |
| 28 | 10 | 4 | 2 | 4 | | 90 |
| 29 | 10 | 2 | 2 | 6 | | 130 |
| 30 | 10 | | 2 | 8 | | 170 |

Example 31

In this example a lacquer of the following composition was prepared:

| | Parts by weight |
|---|---|
| Water-wet nitrocellulose (30% water) (dry weight) | 16.7 |
| Dicyclohexyl phthalate | 13.3 |
| Emulsifying agent | 3.3 |
| Isocyanate D (as used in Example 4) | 1.65 |
| Butyl acetate | 45.0 |
| Methyl cyclohexyl acetate | 2.3 |

The nitrocellulose used in this example was a low viscosity grade of industrial nitrocellulose having an average nitrogen content between 11.2 and 11.8 percent. 40 g. (as dry) of this nitrocellulose dissolved in 100 cc.

aqueous acetone, prepared by mixing 95 volumes acetone with 5 volumes water, had a viscosity of 3-5 poises at 20° C.

The emulsifying agent was a 50 percent solution of stearamidopropyldimethyl-β - hydroxyethyl - ammonium nitrate in an isopropyl alcohol/water mixture. In preparing the above lacquer, isocyanate D was added last after all the other ingredients had formed a homogeneous solution.

2 parts of the lacquer were mixed with 1 part of water (including water introduced as damping medium for nitro-cellulose) by means of a high-speed stirrer to give an emulsion. The emulsion was spread on polypropylene film as used in the previous examples and the coated film was heated at 110° C. for ½ minute. A clear transparent coating layer 0.0013 millimetre in thickness was obtained. The heat-seal strength of the film was 100 grams.

What we claim is:

1. A heat-sealable film comprising a layer of stereo-regular polypropylene which has been subjected to a surface oxidative treatment and an adhering coating layer on at least one of the surfaces of the polypropylene, which coating layer comprises nitrocellulose having a nitrogen content between 10.7 and 12.2% by weight, an isocyanate and a plasticiser comprising at least 50% by weight of an aryl-substituted thiourea which is normally solid the ratio of nitrocellulose to plasticizer being in the range of 10:5 to 10:15 by weight and said isocyanate being proportioned to the nitrocellulose in a ratio between 10:0.4 to 10:0.05 by weight.

2. A heat-sealable film as claimed in claim 1 wherein the coating layer comprises a proportion of resinous material.

3. A heat-sealable film as claimed in claim 2 wherein the proportion of resinous material in the coating layer is less than the proportion of nitrocellulose and the ratio of the combined weight of resinous material and nitrocellulose to plasticiser is within the range 10:5 to 10:15.

4. A heat-selable film as claimed in claim 1 in which the surface oxidative treatment of the polypropylene is such as to reduce the angle of contact between water and the treated surface to 80° or less.

References Cited

UNITED STATES PATENTS

| | | | |
|---|---|---|---|
| 2,668,134 | 2/1954 | Horton | 117—138.8 |
| 2,715,076 | 8/1955 | Wolinski | 117—138.8 |
| 2,770,555 | 11/1956 | Cornwell | 117—144 X |
| 2,931,732 | 4/1960 | Hoffman | 117—144 X |
| 2,950,992 | 8/1960 | Brillhart | 117—144 X |
| 3,023,126 | 2/1962 | Underwood et al. | 117—138.8 |
| 3,202,528 | 8/1965 | James | 117—47 |
| 3,232,789 | 2/1966 | Pelzek et al. | 117—138.8 |
| 3,236,675 | 2/1966 | Hermitte et al. | 117—138.8 |

MURRAY KATZ, *Primary Examiner.*